US011418902B2

(12) United States Patent
Goller et al.

(10) Patent No.: US 11,418,902 B2
(45) Date of Patent: Aug. 16, 2022

(54) SOUND SYSTEM WITH IMPROVED WIDTH OF THE PERCEIVED SOUND SIGNAL (71) Applicant: Harman Becker Automotive Systems GmbH, Karlsbad (DE)

(72) Inventors: Lars Goller, Herning (DK); Alexander Young, Kent (GB)

(73) Assignee: Harman Becker Automotive Systems GmbH, Karlsbad (DE)

(*) Notice: Subject to any disclaimer, the term of this patent is extended or adjusted under 35 U.S.C. 154(b) by 0 days.

(21) Appl. No.: 17/419,996

(22) PCT Filed: Jan. 3, 2019

(86) PCT No.: PCT/EP2019/050103
§ 371 (c)(1),
(2) Date: Jun. 30, 2021

(87) PCT Pub. No.: WO2020/141020
PCT Pub. Date: Jul. 9, 2020

(65) Prior Publication Data
US 2022/0095072 A1    Mar. 24, 2022

(51) Int. Cl.
*H04S 7/00*    (2006.01)
*B60R 11/02*    (2006.01)
*H04R 1/02*    (2006.01)
*H04R 5/02*    (2006.01)

(52) U.S. Cl.
CPC .......... *H04S 7/302* (2013.01); *B60R 11/0217* (2013.01); *H04R 1/025* (2013.01); *H04R 5/023* (2013.01); *H04R 2499/13* (2013.01)

(58) Field of Classification Search
CPC ..... H04S 7/302; B60R 11/0217; H04R 1/025; H04R 5/023; H04R 2499/13
USPC ............................................................ 381/86
See application file for complete search history.

(56) References Cited

U.S. PATENT DOCUMENTS

| 7,159,938 | B1 | 1/2007 | Shiraishi | |
| 2008/0130922 | A1 | 6/2008 | Shibata et al. | |
| 2008/0273724 | A1* | 11/2008 | Hartung | H04S 7/302 |
| | | | | 381/302 |

FOREIGN PATENT DOCUMENTS

KR    20030000459 A1    1/2003

OTHER PUBLICATIONS

International Search Report dated Sep. 18, 2019 for PCT Appn. No. PCT/EP2019/050103 filed Jan. 3, 2019, 13 pgs.

* cited by examiner

*Primary Examiner* — Paul Kim (74) *Attorney, Agent, or Firm* — Brooks Kushman P.C.

(57) ABSTRACT

A sound system configured to output sound signals to a user located in a defined environment, comprising a plurality of transducers configured to output the sound signals, a processing unit configured to individually control at least an electrical delay, a frequency characteristic and a sound level with which the sound signals transmitted to the plurality of transducers are output by each of the plurality of transducers, and a seat for a user to which the sound signals are output, the seat comprising a seating surface and a backrest configured support a back of the user sitting on the seating surface. The backrest comprises an upper surface defining an upper end surface of the backrest. The defined environment influences the sound signals as perceived by the user sitting on the seat.

18 Claims, 5 Drawing Sheets

SOUND SYSTEM WITH IMPROVED WIDTH OF THE PERCEIVED SOUND SIGNAL

CROSS-REFERENCE TO RELATED APPLICATION

This application claims the benefit of priority to PCT Patent Application No. PCT/EP2019/050103, filed on Jan. 3, 2019, and entitled "SOUND SYSTEM WITH IMPROVED WIDTH OF THE PERCEIVED SOUND SIGNAL", the entire disclosure of which is incorporated herein by reference.

The present application relates to a sound system configured to output sound signals to a user first stop.

BACKGROUND

When reproducing audio signals in a limited space, reflection from boundaries will influence the perceived staging of the reproduced audio signals. The intent of the recording is to reproduce the positions of instruments and voices, and the size and character of where the recording was made.

The problem with small spaces is that the first reflections from the room boundaries is masking the direct signal from the speakers which provides that ear with the information about instrument location, size and character of the recording room. This means that the three-dimensional sound image as perceived by the user is corrupted by the early reflections, and it is more difficult for the user to correctly position the recorded voices and instruments. When the sound signals are output by a plurality of transducers in a limited space, such as a vehicle cabin, it is important to process the sound signals transmitted to the different transducers in such a way that the user is not able to localize the sound emitted by the different transducers as otherwise the impression of a wide audio signal present in the recording is lost. When the sound signal is perceived as coming from a certain transducer and not from all of the transducers the quality of the perceived sound signal is decreased.

SUMMARY

Accordingly, there is a need to provide a sound system which is capable to output sound signals to a user in a limited environment while maintaining the width of the received sound signal.

This need is met by the features of the independent claims. The dependent claims describe further aspects of the invention.

According to a first aspect, a sound system is provided configured to output sound signals to a user. The sound system comprises a plurality of transducers configured to output the sound signals. The sound system furthermore comprises a processing unit configured to individually control at least an electrical delay, a frequency characteristic, and a signal level with which the sound signals transmitted to the plurality of transducers are output by each of the plurality of transducers. Furthermore, a seat for a user is provided to which the sound signals are output, where the seat comprises a seat surface and a backrest configured to support a back of a user sitting on the sitting surface. The backrest comprises an upper surface defining an upper end surface of the backrest in a position when the user is sitting on the seat. The defined environment influences the sound signals as perceived by the user sitting on the seat. The plurality of transducers comprise at least one first transducer attached to the seat in such a way that at least one first transducer is positioned below the upper surface. Furthermore, the processing unit is configured to control at least one of the electrical delay, the sound level and frequency characteristic of the sound signal output by the at least one first transducer to at least partially remove the influence of the defined environment.

With the positioning of the at least first transducer below the upper surface, this ensures that a user sitting on the seat receives the sound signal coming from the first transducer from below the ear. The human hearing is normally designed such that a human is able to precisely localize a sound signal around the horizontal plane. However, when the signal comes from a position directly below or above the ears, the human brain has normally more difficulties in correctly positioning the source of the sound. As the user can hardly localize the sound signals emitted by this first transducer, it is possible to add audio signals fed to the user without the user being able to localize the audio signals. Audio signals output by the at least one first transducer can now be designed such that they restore the masked signal components which were masked by the first reflections.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Figure 1:
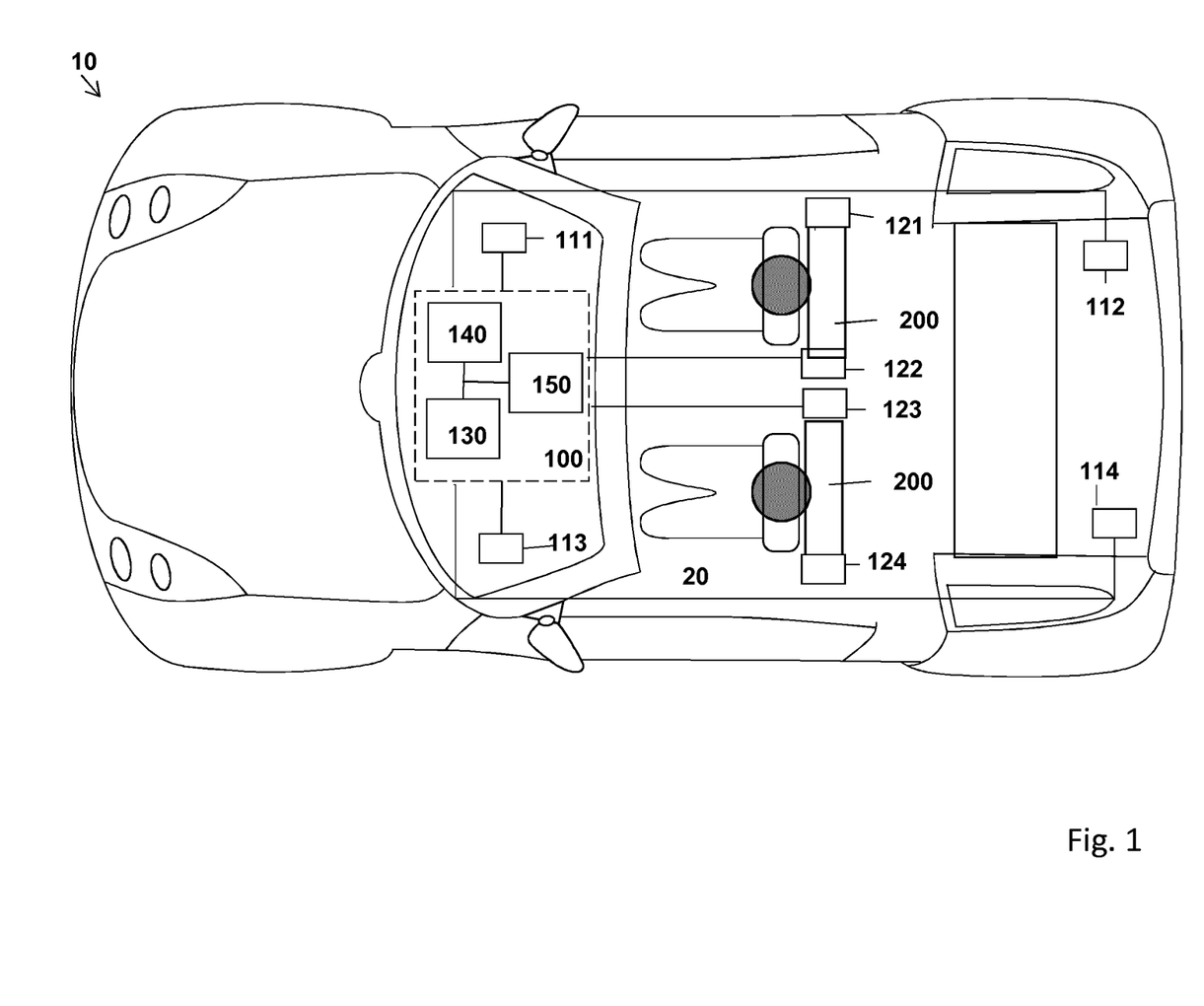
FIG. 1 shows an example schematic view of a sound system incorporated into a vehicle cabin and comprising a transducer attached to a backrest of a seat.

In FIG. 1 a vehicle 10 is shown incorporating a sound system 100 provided in a vehicle cabin 20. The sound system comprises a plurality of transducers 111, 112, 113 and 114. These transducers are distributed in the vehicle cabin, in the embodiment shown, two of the transducers 111 and 113 are provided in the front part of the vehicle, where two other transducers 112 and 114 are located in the back of the vehicle cabin. The sound system furthermore comprises transducers 121 to 124 connected to vehicle seats 200. In the embodiment shown, a first transducer 121 and second transducer 122 is connected to a seat 200, in this case, the right front seat in the vehicle. The transducers 123 and 124 are connected to the other front seat 200, and in this case, the left front seat of the vehicle. The vehicle cabin 20 represents a defined environment with a defined size and defined outer boarders which influences the sound signal output by the transducers, especially by the reflections occurring on the surfaces of the environment.

The sound system furthermore comprises a processing unit 130 comprising one or more processors configured to control, the manner in which, the audio signals are fed to the different transducers 111 to 114 and 121 to 124. The sound system comprises an audio source 140 and a storage element 150. The audio source 140 may be any technically feasible source of electrical audio signals, including, for example, audio signals stored on a recording medium such as a hard disk (e.g. the storage element 150) or any other recording medium. The audio signal may furthermore comprise a radio signal received via a radio receiver not shown in the figures. Furthermore, the storage element 150 can be provided configured to store audio signals and/or program code to be executed by the processing unit 130 needed to operate the audio system 100. The storage element 150 may be any technically feasible medium configured to store data, including, a hard disk, a random access memory, read only memory and so forth. The processing unit 130 may be any technically feasible hardware for processing data, especially audio data, and executing applications, including, for example a central processing unit, CPU, an application-specific integrated circuit, ASIC, a field programmable gate array, FPGA.

The processing unit 130 is capable of individually controlling the sound signal fed to each of the different transducers. The processing unit can control the delay with which the second signal is fed to the corresponding transducer. Furthermore, the processing unit is able to control a signal level used for the output of each of the transducers.

Figure 2:
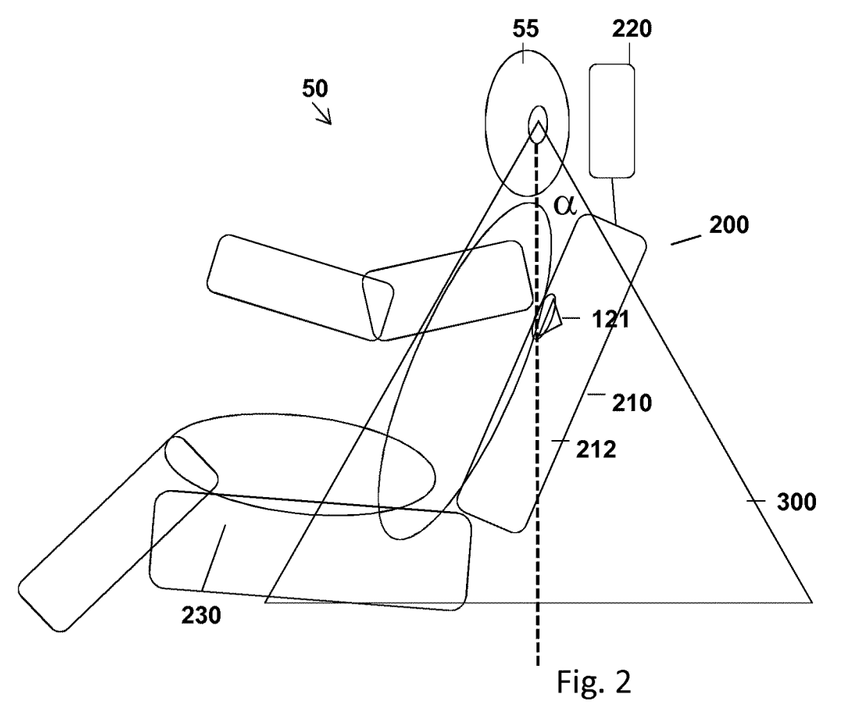
FIG. 2 shows an example schematic view of a position of the first transducer attached to a backrest of a seat.

As shown in further detail in connection with FIG. 2, the transducers 121-124 are also called first transducers, are attached to a backrest 210 of the seat 200. Furthermore, a user 50 is schematically shown as sitting on a seating surface 230 of the seat 200. The transducers 121 to 124 are preferably located in positions where the sound signal emitted by the transducers 121 to 124 directly reaches the user's ears. The left part of FIG. 2 shows a back view of the seat 200, and as can be seen the transducers 121 and 122 are attached to a side surface of the backrest 210. The backrest 210 comprises an upper surface 211 which defines the upper end surface of the backrest 210 and a headrest 220 is not taken into account. From the right part of FIG. 2, it can be seen that the transducer 121 is located below the user's ears 55. With this position of the transducers 121 to 124 the user can hardly localize the sound signal emitted by these transducers. A preferred position of the transducer is below the shoulders behind the arms close to a direct path between the loudspeaker and the ear. This position allows to add signals to restore the positioning of the recording and to re-create the scale of the recording without the transducer itself being detected. In the embodiment shown in FIG. 2, a transducer 121, 122 is connected to each side surface 212 of the backrest. The right part of FIG. 2 shows an area 300 where the transducer or the transducers may be located without the user being able to locate such transducer(s). The area is defined by a triangle or cone. The cone is originating at the user's head, especially at the height of the ears 55 and the outer surface is defined by an opening angle alpha occurring between a vertical line passing through an apex of the cone and the outer surface of the cone. The angle alpha is preferably between 20 and 25° so that the opening angle of the cone is between 40 and 50°.

The ear is very capable of detecting sound arriving from the front and from the rear side, or from the left or right side or even from above. The direction in which a human being is the least capable to detect the direction or to localize the sound is the direction from below.

Figure 3:
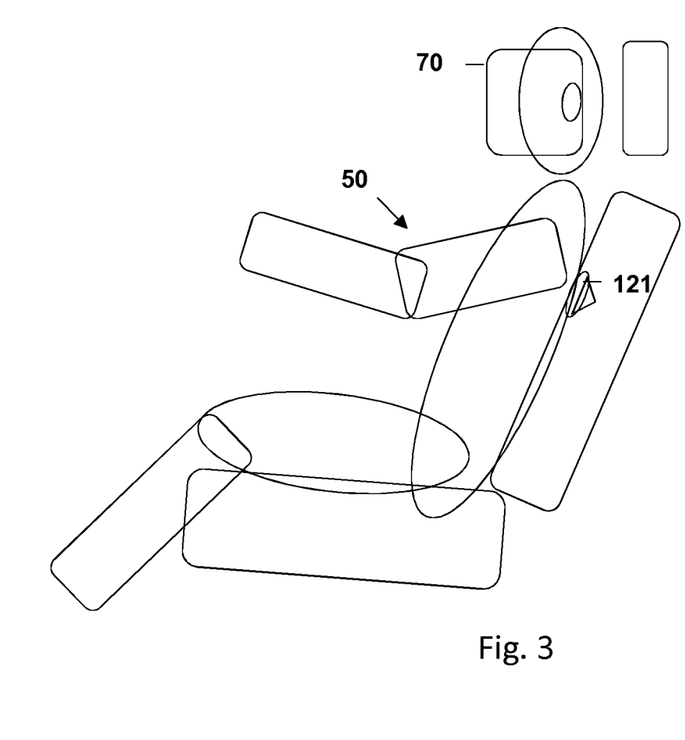
FIG. 3 shows an example schematic view of a measurement area used to measure a frequency response for a user sitting on the seat.

FIG. 3 shows a schematic view of a measurement area 70 in which the frequency responses in the vehicle cabin were measured for the signals output by the transducers 111 to 114 and for the signals output by the transducers 121 to 124.

Figure 4:
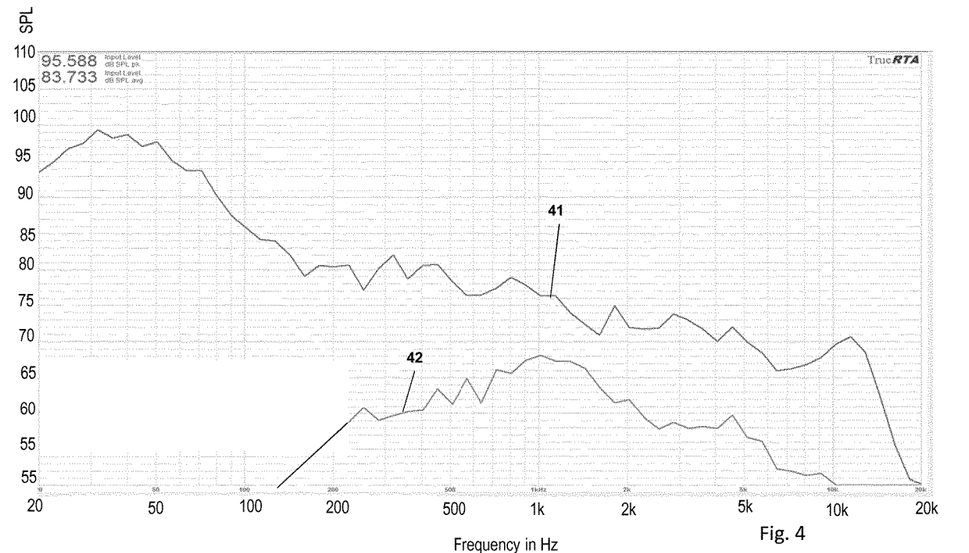
FIG. 4 shows a schematic representation of a frequency response from a first transducer compared to the frequency response of the other transducers of the audio system of FIG. 1.

The frequency responses are shown in FIG. 4. The curve 41 shows the combined response from all transducers 111 to 114, whereas the curve 42 shows the frequency response from the transducers 121 to 124 located at the backrest of the seat 200. The transducers attached to the seat are preferably wide-band speakers which emit sound signals in the range starting from a lower end between 100 and 250 Hz and an upper end at a frequency between 2 and 12 kHz., e.g. an upper end at 5 kHz, at 10 kHz or 12 kHz.

As can be seen from FIG. 4 the signal pressure level of the signals shown by curve 41 is between 10 and 30 dB SPL higher than the signal level of curve 42, but higher levels can be added without the transducer position being detected.

The positioning of the speakers 111-114 (and any other speaker in the environment) and the character of the environment, shape, size and material, determines the characteristics of the reflected signals such as the amplitude, frequency content, and their delay.

The amplitude, frequency content and delay determines the effect on the subjective perception; positioning of instruments and voices and their character.

A sound tuner skilled in the art will be able to tune the frequency character to be perceived linear, but the imaging towards the side of the earliest reflections will suffer. For a left hand side driven car, the left side of the imaging will be impacted. Images tend to position within the car, and are not distributed evenly to the left and right side of the car as originally intended in the recording.

Figure 5:
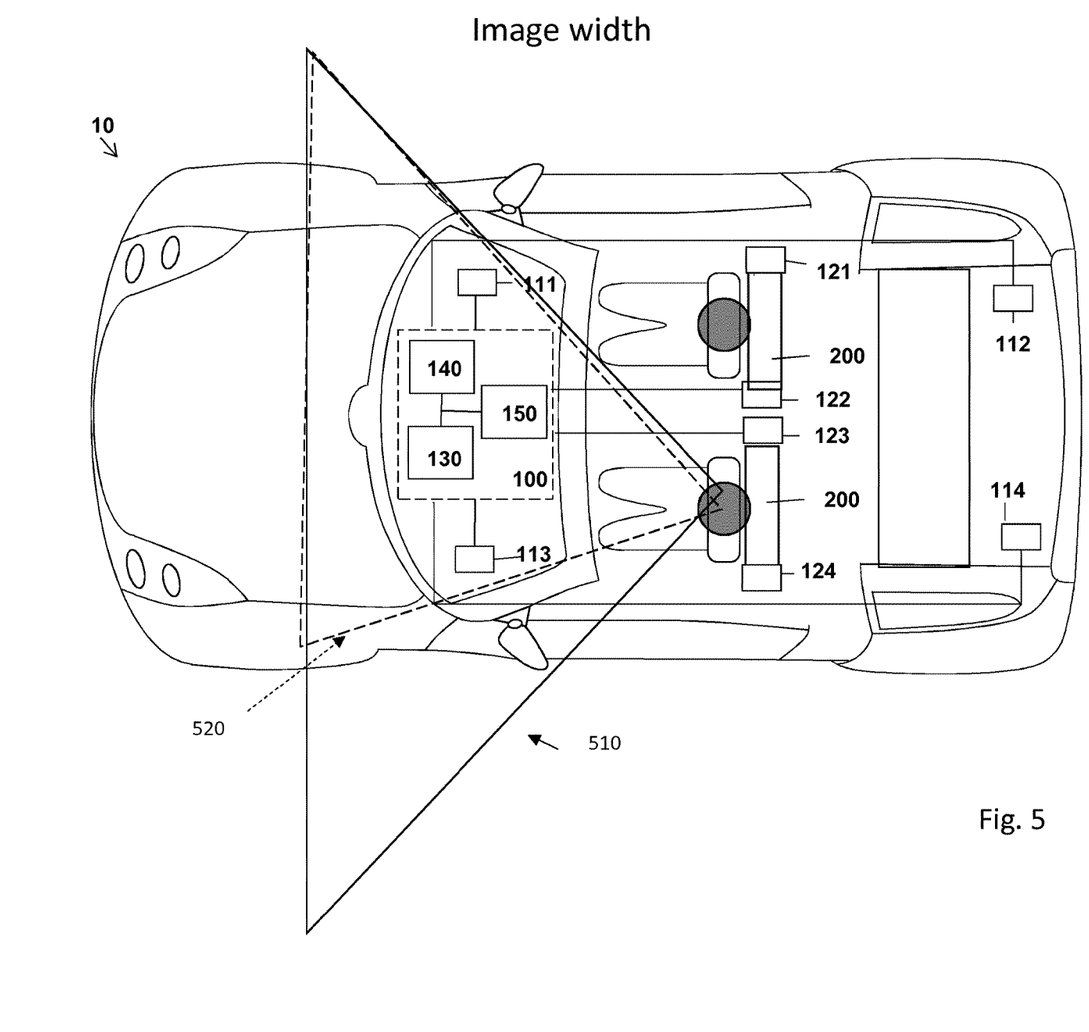
FIG. 5 shows a schematic view of the sound system of FIG. 1, indicating a perceived width with which the sound signal is perceived by a user in the vehicle.

The compensating or first speakers 121-124 will be able to restore the signal to comply more with the original intention if following this design example For example, in FIG. 5, the solid triangle 510 corresponds to a signal as heard in a symmetric listening room with a controlled reflective environment (corresponding to an ideal environment).

In the following, the listening experience perceived in the driver position is discussed and the listening experience will be similar for the passenger side, only the right hand side images will be positioned closer to the center as intended.

It is assumed that speakers 111-114 have been time aligned to arrive simultaneously at the listener/user 50.

The left side phantom images (voices and instruments) are localized within the vehicle (dotted triangle 520)—near in front of the steering wheel, and not as far to the left as intended in the recording as represented by the solid triangle 510.

The speaker 124 is positioned as described. The timely arrival from 124 is compensated for to reach the ear within a few milliseconds after the speakers 111-114, and a signal limited to signals above e.g. 60 Hz is fed to transducer 124 (as lower frequencies are hard to position) and shaped as the signal received by main speakers 111-114.

The SPL level of the speaker 124 can be adjusted until the left hand side position of instruments and voices corresponds with the intention of the recording.

If some excessive or too little widening is heard, there is a need for a timbre adjustment of the signal for the 124. To have a wider position of high frequency dominated instruments, the high frequencies, e.g. above 500 Hz, above 1.0 kHz above 1,5, kHz, or above 2 kHz, or above 5 kHz are increased. To have a more narrow positioning the SPL level of the high frequencies is decreased.

The same applies for the lower frequencies e.g. below 500 Hz, below 1.0 kHz, below 1.5 kHz or below 2 kHz, or below 5 kHz if the level is increased at lower frequencies the position is widened at lower frequencies, and opposite the position gets more narrow with less SPL level at lower frequencies.

Most images are localized due to signals in the mid frequencies from 500-5 kHz, with a preference for signals in the 1-2 kHz region.

This is also seen from FIG. 4 where the frequency content of 124 is measured relative to the full signal of the audio system.

Frequencies below 200 Hz may not be compensated for, as many bass instruments are recorded in mono, and the level between 1-2 kHz is reaching −10 dB relative to the system SPL. Above 2 kHz and below 1 kHz, the signals are slowly attenuated to reach −20 dB at 300 Hz and 12 kHz respectively.

Returning to FIGS. 1 to 3, especially FIG. 1, it can be seen that transducers 121 and 122 are closer to the user than the transducers 111 to 114. Accordingly, a larger delay is applied to the signals fed to the transducers 121 to 124 when compared to the signal fed to transducers 111 to 114. By way of example, the delay may be 1 to 2 ms higher for the signals fed to the transducers 121 to 124 when compared to the signal transmitted to the transducers 111 to 114. It is also possible that the delay of the at least one first transducer is the same as for the other loudspeakers 111 to 114.

From the above set some general conclusions can be drawn.

The transducers 121 to 124 are called first transducers compared to the remaining transducers 111 to 114. This first transducer may be attached to the backrest of the seat.

As discussed in connection with FIGS. 2 and 3, the at least one first transducer 121 to 124 may be attached to a side surface of the backrest. Furthermore, two first transducers may be attached to each seat, preferably one to each side surface.

The at least one first transducer could be attached to the backrest in such a way that the at least one first transducer is positioned at least 0.1 or 0.2 m away from the upper surface of the backrest (without taking into account the headrest). Preferably, the position is such that the loudspeaker is not covered by the arm of the user sitting on the seat. The distance from the ear can be any distance as long as the opening angle of the cone in which the first transducer is located is not higher than app. 50 degrees.

The seat may furthermore comprise a headrest, but the upper surface of the backrest is not the upper surface of the complete seat including the headrest. The upper surface is located between the headrest and the at least one first transducer.

It is possible that the processing unit may control, in order to at least partially remove the influence of the environment, the signal level of the sound signal to be output by the at least one first transducer 121 to 124 such that it is lower than the sound level to be output by the others of the plurality of transducers. This is shown in connection with FIG. 4 from where it can be deduced that the signal pressure level is lower for the first transducers compared to the remaining transducers.

Furthermore, the processing unit may control, in order to at least partially remove the influence of the environment, a frequency characteristic of the sound signal output by the at least one first transducer 121-124 to be in a frequency range limited to frequencies above 60 Hz and below 12 Khz, preferably above 100 Hz and below 5 kHz. Accordingly, the first transducer may be a wide band transducer configured to output frequencies in a frequency range limited to frequencies above 60 or 100 Hz and below 5, 10 or 12 kHz.

Furthermore, it is possible that the at least one first transducer is located within an area delimited by a cone extending downward in a vertical direction with an apex of the cone being located at the user's head sitting on the seat in a normal position. The opening angle of the cone may be up to 50° and extends downward in the vertical direction.

As discussed above, the sound signal to be output by the plurality of loudspeakers comprises a recording characteristic, which when output in an ideal environment, provides a first spatial width of the sound signal representing a recording situation of the sound signal. The sound signal as perceived by the user is perceived with a second spatial width different to the first spatial width due to the defined environment. The processing unit, for at least partially removing the influence of the defined environment, may be configured to control at least one of the delay, frequency characteristic and sound level such that the second spatial width approaches the first spatial width.

By way of example, when the second spatial width is smaller than the first spatial width in a defined frequency range, the processing unit can be configured to increase the signal level of the audio signal in the defined frequency range in order to widen the first width.

When the second spatial width is larger than the first spatial width in a defined frequency range, the processing unit 130 may be configured to decrease the signal level of the audio signal in the defined frequency range in order to narrow the first width.

Furthermore, the processing unit 130 can be configured, for at least partially removing the influence of the defined environment, to control the delay of the sound signal output by the at least one transducer 121-124 such that the delay is larger than the delay applied to the remaining of the plurality of transducers.

The sound system may be a vehicle sound system and the seat may be one of the front seats provided in the vehicle cabin. At least one first transducer may be attached to each front seat of the vehicle cabin and it is possible and preferred that two first transducers are attached to one seat, one on the left side surface and one on the right side surface.

However, it should be understood that the invention is not limited to vehicle applications. It can apply to any limited space where the room boundaries are comparatively close to the user (e.g. within 2 meter). A further field of application is a gaming console in which a user is also sitting on a seat. In a gaming console including a seat the gaming console preferably comprises a first transducer on each side of the seat in a position as discussed above. The boundaries of the environment may be as close as in a vehicle, however such boundaries may also be further away, as the effect stays independent on the distance to the room boundaries, as the signals from the first transducers will overrule the reflected signals. Independent of the distance to the boundaries, the position in question will allow to increase the width of the stage, also enhancing sound experience, be it in a vehicle or in a gaming chair.

As discussed above the main point of the present application is to position a lot speaker or transducer in a position that allows one to restore/add the masked signals without this speaker itself being detected.

The invention claimed is:

1. A sound system configured to output sound signals to a user located in a defined environment, comprising:
   a plurality of transducers comprising at least one first transducer and at least one second transducer being configured to output the sound signals,
   a processing unit configured to individually control at least an electrical delay, a frequency characteristic and a sound level with which the sound signals transmitted to the plurality of transducers are output by each of the plurality of transducers,
   a seat for a user to which the sound signals are output, the seat comprising a seating surface and a backrest configured support a back of the user sitting on the seating surface,
   wherein the backrest comprises an upper surface defining an upper end surface of the backrest in a position when the user is sitting on the seat,
   wherein the defined environment influences the sound signals as perceived by the user sitting on the seat,
   wherein the at least one first transducer is attached to the seat in such a way that the at least one first transducer is positioned below the upper surface,
   wherein the processing unit is configured to control at least one of the delay, frequency characteristic and sound level of the sound signal output by the at least one first transducer so as to at least partially remove the influence of the defined environment on the sound signal as perceived by the user,
   wherein the at least one first transducer is attached to a side surface of the backrest below shoulders and behind arms close to a direct path between the at least one first loudspeaker and an ear of the user, and
   wherein the processing unit is configured to at least partially remove the influence of the defined environment to control a signal level of the sound signal to be output by the at least one first transducer to be lower than a sound level output by remaining transducers of the plurality of transducers.

2. The sound system of claim 1, wherein the at least one first transducer is attached to the seat in such a way that is the first transducer is positioned at least 0.1 m or 0.2 m away from the upper surface of the backrest.

3. The sound system of claim 1, wherein the seat comprises a headrest, wherein the upper surface is located between the headrest and the at least one first transducer.

4. The sound system of claim 1, wherein the processing unit is configured to at least partially remove the influence of the defined environment, to control a frequency characteristic of the sound signal output by the at least one first transducer to be in a frequency range limited to frequencies above 60 Hz and below 12 Khz.

5. The sound system claim 1, wherein the at least one first transducer is located within an area) delimited by a cone extending in a downward vertical direction with an apex of the cone being located at a user's head sitting in a usual position on the seat, wherein the cone comprises an opening angle smaller or equal 45 degrees.

6. The sound system of claim 1, wherein the sound system is a vehicle sound system and the seat is one of a first front seat and a second front seat provided in the vehicle cabin.

7. The sound system of claim 6, wherein one first transducer is attached to each of the first front seat and the second front seat in the vehicle cabin.

8. The sound system of claim 1, wherein the at least one first transducer is attached to each outer side surface of the backrest.

9. The sound system of claim 1, wherein the sound signal to be output by the plurality of loudspeakers comprises a recording characteristic, which when output in an ideal environment provides a first spatial width of the sound signal representing a recording situation of the sound signal, wherein the sound signal as perceived by the user is perceived with a second spatial width different to the first spatial width due to the defined environment, and wherein the processing unit, for at least partially removing the influence of the defined environment, is configured to control at least one of the delay, the frequency characteristic and the sound level such that the second spatial width approaches the first spatial width.

10. The sound system of claim 9, wherein when the second spatial width is smaller than the first spatial width in a defined frequency range, the processing unit is configured to increase a signal level of an audio signal in the defined frequency range to widen the first width.

11. The sound system of claim 9, wherein when the second spatial width is larger than the first spatial width in a defined frequency range, the processing unit is configured to decrease a signal level of an audio signal in the defined frequency range to narrow the first width.

12. The sound system of claim 1, wherein the processing unit is configured, for at least partially removing the influence of the defined environment, to control the delay of the sound signal output by the at least one first transducer such that the delay is larger than a delay applied to remaining transducers of the plurality of transducers.

13. A sound system configured to output sound signals to a user located in a defined environment, comprising:
   a plurality of transducers including at least one first transducer and at least one second transducer being configured to output the sound signals,
   a processing unit configured to individually control at least an electrical delay, a frequency characteristic and a sound level of the sound signals transmitted to the plurality of transducers are output by each of the plurality of transducers,
   a seat for a user to which the sound signals are output, the seat comprising a seating surface and a backrest configured to support a back of the user sitting on the seating surface, wherein the backrest comprises an upper surface defining an upper end surface of the backrest in a position when the user is sitting on the seat, wherein the defined environment influences the sound signals as perceived by the user sitting on the seat, wherein the at least one first transducer is positioned below the upper surface, wherein the processing unit is configured to control at least one of the delay, frequency characteristic, and sound level of the sound signal output by the at least one first transducer to at least partially remove the influence of the defined environment on the sound signal as perceived by the user, wherein the at least one first transducer is attached to a side surface of the backrest below shoulders and behind arms close to a direct path between the at least one first loudspeaker and the user, and wherein the processing unit is configured to at least partially remove the influence of the defined environment to control a signal level of the sound signal to be output by the at least one first transducer to be lower than a sound level output by remaining transducers of the plurality of transducers.

14. The sound system of claim 13, wherein the at least one first transducer is attached to the seat in such a way that is the first transducer is positioned at least 0.1 m or 0.2 m away from the upper surface of the backrest.

15. The sound system of claim 13, wherein the seat comprises a headrest, wherein the upper surface is located between the headrest and the at least one first transducer.

16. A sound system configured to output sound signals to a user located in a defined environment, comprising:
   a plurality of transducers including at least one first transducer and at least one second transducer being configured to output the sound signals,
   a processing unit configured to individually control at least an electrical delay, a frequency characteristic and a sound level with which the sound signals are transmitted,
   a seat for a user to which the sound signals are output, the seat comprising a seating surface and a backrest configured support a back of the user sitting on the seating surface, wherein the backrest comprises an upper surface defining an upper end surface of the backrest in a position when the user is sitting on the seat, wherein the defined environment influences the sound signals as perceived by the user sitting on the seat, wherein the at least one first transducer is attached to the seat in such a way that the at least one first transducer is positioned below the upper surface, wherein the processing unit is configured to control at least one of the delay, frequency characteristic, and sound level of the sound signal output by the at least one first transducer so as to at least partially remove the influence of the defined environment on the sound signal as perceived by the user, wherein the at least one first transducer is attached to a side surface of the backrest below shoulders and behind arms close to a direct path between the at least one first loudspeaker and an ear of the user, and wherein the processing unit is configured to at least partially remove the influence of the defined environment to control a signal level of the sound signal to be output by the at least one first transducer to be lower than a sound level output by remaining transducers of the plurality of transducers.

17. The sound system of claim 16, wherein the at least one first transducer is attached to the seat in such a way that is the first transducer is positioned at least 0.1 m or 0.2 m away from the upper surface of the backrest.

18. The sound system of claim 16, wherein the seat comprises a headrest, wherein the upper surface is located between the headrest and the at least one first transducer.

* * * * *